US012244653B2

(12) United States Patent
Gupta et al.

(10) Patent No.: US 12,244,653 B2
(45) Date of Patent: Mar. 4, 2025

(54) INTER-CHANNEL CONTEXT TRANSFER INTERMEDIARY

(71) Applicant: State Farm Mutual Automobile Insurance Company, Bloomington, IL (US)

(72) Inventors: Amit Gupta, Normal, IL (US); Ritesh Saraf, Long Grove, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

(21) Appl. No.: 18/205,697

(22) Filed: Jun. 5, 2023

(65) Prior Publication Data

US 2024/0406221 A1 Dec. 5, 2024

(51) Int. Cl.
*G06F 15/16* (2006.01)
*H04L 65/1069* (2022.01)
*H04L 65/1095* (2022.01)

(52) U.S. Cl.
CPC ...... *H04L 65/1069* (2013.01); *H04L 65/1095* (2022.05)

(58) Field of Classification Search
CPC .............. H04L 65/1069; H04L 65/1095
USPC ..................................................... 709/227
See application file for complete search history.

(56) References Cited

U.S. PATENT DOCUMENTS

| 7,251,696 | B1 * | 7/2007 | Horvitz | H04L 51/00 709/227 |
| 7,929,686 | B2 * | 4/2011 | Bienfait | H04M 7/003 379/265.11 |
| 8,005,700 | B2 * | 8/2011 | Amitabh | G06Q 10/10 705/2 |
| 8,565,411 | B2 | 10/2013 | Kannan et al. | |
| 8,755,372 | B2 * | 6/2014 | Fried | G06Q 30/02 370/352 |
| 8,767,945 | B2 * | 7/2014 | Simoes | H04M 3/5191 379/265.09 |
| 8,805,941 | B2 * | 8/2014 | Barak | H04M 1/72436 709/227 |
| 8,831,203 | B2 | 9/2014 | Chang et al. | |
| 9,003,141 | B2 * | 4/2015 | Nielsen | G06F 11/20 718/1 |
| 9,075,536 | B1 * | 7/2015 | Nielsen | G06F 3/065 |
| 9,088,657 | B2 * | 7/2015 | Bushey | H04M 3/5235 |
| 9,106,724 | B1 * | 8/2015 | Harris | H04M 3/5183 |
| 9,331,969 | B2 * | 5/2016 | Barak | H04L 67/55 |
| 9,389,791 | B2 * | 7/2016 | Nielsen | G06F 9/5077 |
| 9,443,216 | B2 * | 9/2016 | Singh | G06Q 10/0633 |
| 9,519,906 | B2 * | 12/2016 | Anisimov | G06Q 30/02 |
| 9,559,993 | B2 | 1/2017 | Palakovich et al. | |
| 9,569,743 | B2 * | 2/2017 | Fehr | G06Q 30/016 |
| 9,904,927 | B2 * | 2/2018 | Fehr | G06N 20/00 |

(Continued)

*Primary Examiner* — Alicia Baturay
(74) *Attorney, Agent, or Firm* — Lee & Hayes, P.C.

(57) ABSTRACT

Techniques described herein relate to inter-channel transfer at an automated contact center, in order to transfer communication sessions from a first channel to a second channel. In addition to channel transfer operations, communication session context data can be transferred from the first channel to the second channel and a communication session summary can be generated and provided to second channel devices. Furthermore, a communication session can be loaded in a second channel queue based on the communication session via the first channel.

20 Claims, 7 Drawing Sheets

(56) References Cited

U.S. PATENT DOCUMENTS

| | | | |
|---|---|---|---|
| 9,973,457 B2 | 5/2018 | Cauchois et al. | |
| 10,051,011 B2* | 8/2018 | Boerjesson | H04L 65/1073 |
| 10,264,124 B2* | 4/2019 | Batlle | H04M 3/5166 |
| 10,313,522 B2* | 6/2019 | Batlle | H04M 3/5183 |
| 10,326,802 B1* | 6/2019 | Irwan | H04L 67/025 |
| 10,574,822 B1 | 2/2020 | Sheshaiahgari et al. | |
| 10,671,248 B2 | 6/2020 | Muramoto et al. | |
| 10,726,203 B2* | 7/2020 | Zakharov | G06F 16/3347 |
| 10,805,467 B2* | 10/2020 | Batlle | H04M 3/5166 |
| 10,827,062 B1* | 11/2020 | Paiva | H04M 3/5232 |
| 10,827,069 B1* | 11/2020 | Paiva | H04M 3/5237 |
| 10,868,920 B1* | 12/2020 | Kodimer | H04L 51/56 |
| 10,904,169 B2 | 1/2021 | Barve et al. | |
| 10,917,520 B1* | 2/2021 | T. G | H04M 3/5233 |
| 10,944,870 B1* | 3/2021 | Paiva | H04M 3/5166 |
| 10,949,860 B2* | 3/2021 | Zhang | G06N 20/00 |
| 11,032,420 B2 | 6/2021 | Hillier et al. | |
| 11,201,964 B2* | 12/2021 | Paiva | G06F 3/0482 |
| 11,228,681 B1* | 1/2022 | Rosenberg | H04M 3/5175 |
| 11,337,133 B1* | 5/2022 | Dhawan | H04L 43/0841 |
| 11,431,851 B2* | 8/2022 | DiMaria | H04L 65/1069 |
| 11,496,422 B2* | 11/2022 | Higgins | G06F 40/216 |
| 11,546,472 B2* | 1/2023 | DiMaria | H04L 65/1069 |
| 11,563,852 B1* | 1/2023 | Can | H04M 3/5175 |
| 11,665,282 B2* | 5/2023 | DiMaria | H04L 67/306 |
| | | | 379/209.01 |
| 11,671,388 B1* | 6/2023 | Skinner | H04L 51/222 |
| | | | 709/206 |
| 11,706,344 B2* | 7/2023 | Skinner | H04M 3/5232 |
| | | | 379/265.09 |
| 11,706,345 B1* | 7/2023 | Desai | H04M 3/5175 |
| | | | 379/266.01 |
| 11,710,002 B1* | 7/2023 | Betteridge | G06F 40/47 |
| | | | 704/2 |
| 11,716,671 B2* | 8/2023 | Dhawan | H04L 43/0864 |
| | | | 370/329 |
| 11,757,999 B1* | 9/2023 | Skinner | H04L 67/141 |
| | | | 709/227 |
| 11,762,929 B1* | 9/2023 | Meyer | G06Q 30/0202 |
| | | | 707/741 |
| 11,785,143 B2* | 10/2023 | DiMaria | H04L 9/50 |
| | | | 713/193 |
| 11,818,295 B1* | 11/2023 | Pandiri | H04M 3/5232 |
| 11,849,069 B1* | 12/2023 | Can | H04M 3/5175 |
| 11,863,872 B2* | 1/2024 | Rewatkar | H04N 7/15 |
| 11,876,757 B2* | 1/2024 | Higgins | G06F 11/3495 |
| 11,882,240 B2* | 1/2024 | Batlle | H04M 3/5166 |
| 11,895,271 B1* | 2/2024 | Skinner | G06Q 30/016 |
| 11,979,464 B2* | 5/2024 | Skinner | H04L 67/02 |
| 2007/0043822 A1* | 2/2007 | Brumfield | H04L 51/04 |
| | | | 709/207 |
| 2007/0280460 A1* | 12/2007 | Harris | H04M 3/5166 |
| | | | 379/201.01 |
| 2010/0190477 A1* | 7/2010 | Williams | G06Q 10/02 |
| | | | 455/414.1 |
| 2013/0124807 A1* | 5/2013 | Nielsen | G06F 11/1482 |
| | | | 711/E12.103 |
| 2013/0346595 A1* | 12/2013 | Bulut | H04L 67/566 |
| | | | 709/224 |
| 2014/0153703 A1* | 6/2014 | Desai | H04M 3/5231 |
| | | | 379/88.01 |
| 2014/0226809 A1* | 8/2014 | King | H04M 3/5231 |
| | | | 379/265.11 |
| 2015/0036548 A1* | 2/2015 | Weir | H04M 3/42221 |
| | | | 370/259 |
| 2015/0310380 A1* | 10/2015 | Acres | G06Q 30/016 |
| | | | 705/7.16 |
| 2017/0054846 A1* | 2/2017 | Dervan | H04M 7/003 |
| 2017/0289355 A1* | 10/2017 | Mezhibovsky | H04M 3/5238 |
| 2018/0137401 A1* | 5/2018 | Kumar | G06F 16/245 |
| 2020/0153969 A1* | 5/2020 | Dougherty | G10L 17/06 |
| 2020/0228657 A1* | 7/2020 | Lee | H04M 3/5191 |
| 2020/0356877 A1* | 11/2020 | Freeman | G06N 7/01 |
| 2022/0086279 A1* | 3/2022 | Skinner | H04M 3/5232 |
| 2022/0232126 A1 | 7/2022 | Naidu et al. | |
| 2023/0164271 A1* | 5/2023 | DiMaria | H04L 65/403 |
| | | | 379/209.01 |
| 2023/0319049 A1* | 10/2023 | Cotterell | H04L 63/102 |
| | | | 726/9 |
| 2023/0336663 A1* | 10/2023 | Lekas | H04L 67/141 |
| 2024/0114362 A1* | 4/2024 | Wang | G06N 3/049 |
| 2024/0121628 A1* | 4/2024 | Wang | H04W 24/04 |
| 2024/0121636 A1* | 4/2024 | Wang | H04L 41/16 |
| 2024/0171480 A1* | 5/2024 | Sheoran | H04L 41/5067 |

* cited by examiner

INTER-CHANNEL CONTEXT TRANSFER INTERMEDIARY

BACKGROUND

Large organizations often use automated contact centers to handle interactions between employees or representatives of the organization and customers or other parties. Different types of organizations, including businesses, government agencies, and educational institutions may use automated contact centers for sales, customer service, technical and software support, problem resolution, or the like. Automated contact centers may be small or large-scale, depending on the amount of customer traffic and the structure of the organization. Large-scale contact centers, for example, may include representatives in different roles and/or different departments, using client systems that are distributed across different data centers, geographic locations, and/or networks. In some cases, a customer call or other contact (e.g., video or chat session) into the contact center may be answered first by an automated computer system which requests a series of inputs from the customer to determine where the contact is to be routed.

The various hardware, network, and software components of a contact center may connect and support interactive media sessions between customers and organization representatives, each working independently on the separate computing devices. The contact center also may support transferring customer interaction sessions to different representatives, multi-party interactive sessions, interactions between organization representatives and administrators, etc. Different combinations of interactive session types and/or media types are supported by various contact centers, such as voice sessions (e.g., telephony-based), video chat sessions, email communications, social media-based sessions, etc. Certain contact centers also may use software-based queuing and routing techniques to connect specific customers with specific representatives based on characteristics and criteria such as the purpose of the customer contact, the session/media type, geographic location, language, representative qualifications and certifications, etc.

Because contact centers may be distributed geographically, may support multiple interactive session types and/or media types, and may be used for multiple purposes, coordinating representatives, e.g., by distributing information to those representatives and managing transfers between representatives using different communication channel types, is often difficult. Conventionally, an administrator desiring to distribute information will compose and send a message in a specific messaging application, e.g., an e-mail or instant messaging app. The recipient(s) of the message will receive the message only if he/she is running, e.g., logged into, the messaging application and/or is actively checking for new messages. However, representatives accessing the contact center may be using specific (and disparate) applications to interact with different types of customers and may not have an opportunity to share substantive information about the customer interaction. Accordingly, there is a need in the art for improved transfer techniques to transfer customer interactions from a first channel to a second channel within contact center environments.

SUMMARY

To address problems and inefficiencies associated with automated contact centers, this disclosure describes various systems and techniques for inter-channel context transfer which can be performed by an intermediary process at an automated contact center. For example, a communication session via a first channel can be transferred to a second channel using techniques described herein. Example operations can include transfer of communication session context data from the first channel to the second channel, as well as generation and transfer of a communication session summary. Further example operations can include prioritizing the communication in a second channel queue based on the communication session via the first channel.

In an example of the present disclosure, a method can comprise receiving, by a system comprising one or more processors, a request to transfer a communication session from a first channel to a second channel, wherein the first channel connects one or more first devices and one or more second devices, and wherein the second channel connects the one or more first devices and one or more third devices. The method can further include, in response to the request, transferring, by the system, the communication session from the first channel to the second channel, wherein transferring the communication session from the first channel to the second channel comprises: receiving, by the system, communication session context data from the one or more second devices of the first channel; generating, by the system, a communication session summary based at least in part on recurring data included in the communication session context data; storing, by the system, the communication session context data and the communication session summary in a second channel storage location that is accessible by the one or more third devices of the second channel; and establishing, by the system and based on the request, a connection between the one or more first devices and the one or more third devices of the second channel.

In another example of the present disclosure, a system is provided, comprising one or more processors and one or more non-transitory computer-readable media storing computer-executable instructions that, when executed by the one or more processors, cause the one or more processors to perform operations. The operations can comprise receiving a request to transfer a communication session from a first channel to a second channel, wherein the first channel connects one or more first devices and one or more second devices, and wherein the second channel connects the one or more first devices and one or more third devices; receiving communication session context data acquired from the one or more second devices of the first channel; generating a communication session summary based at least in part on recurring data included in the communication session context data; establishing a connection between the one or more first devices and the one or more third devices of the second channel in order to fulfill the request to transfer the communication session from the first channel to the second channel; and loading the communication session context data and the communication session summary at a location accessible by at least one third device of the one or more third devices.

In yet another example of the present disclosure, one or more non-transitory computer-readable media are disclosed, the non-transitory computer-readable media storing instructions executable by a processor, wherein the instructions, when executed by the processor, cause the processor to perform operations. The operations can comprise receiving a channel transfer request to transfer a communication session from a first channel to a second channel, wherein the first channel connects one or more first devices and one or more second devices, and wherein the second channel connects the one or more first devices and one or more third devices; receiving communication session context data acquired via the first channel; and establishing a second channel connection between the one or more third devices and the one or more first devices in order to fulfill the channel transfer request. Establishing the second channel connection can comprise: acquiring, via the first channel, second channel connection information from the one or more first devices; inserting an identifier associated with the communication session in a second channel queue; using the second channel connection information to establish a first connection to the one or more first devices in accordance with a position of the identifier in the second channel queue; providing the communication session context data to a selected device of the one or more third devices; and linking the first connection to the selected device.

Further aspects and embodiments of the present disclosure are described in detail below.

DETAILED DESCRIPTION

Figure 1:
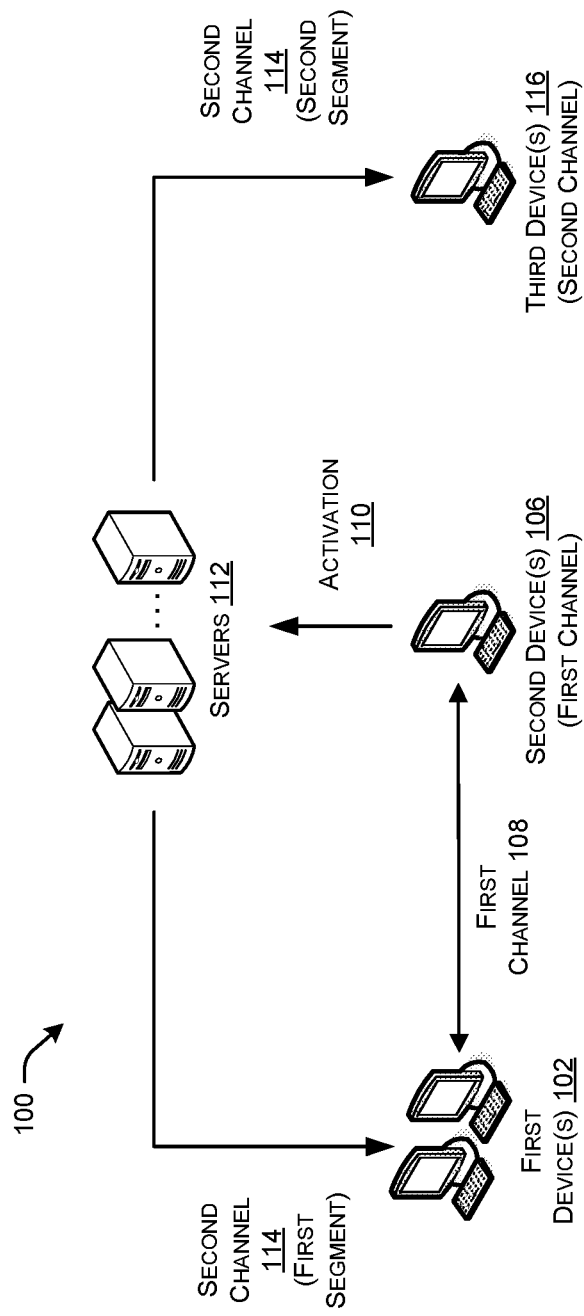
FIG. 1 illustrates a first channel between first devices and second devices, and a second channel between the first devices and third devices, wherein a transfer from the first channel to the second channel can be facilitated by a channel transfer manager at server devices, in accordance with one or more examples of the present disclosure.

FIG. 1 shows an example environment 100 in which a first channel is between first devices and second devices, and a second channel is between the first devices and third devices. In the example environment 100, a transfer from the first channel to the second channel can be facilitated by a channel transfer manager at server devices, in accordance with one or more examples of the present disclosure. The example environment 100 shown in FIG. 1 includes first devices 102, second devices 106, third devices 116, and servers 112.

In an example according to FIG. 1, a communication session can be initiated via a first channel 108, wherein the first channel 108 comprises communications between the first devices 102 and the second devices 106. The second devices 106 can send an activation 110, also referred to herein as an activation message or activation notification, to the servers 112, in order to initiate a transition of the communication session to a second channel 114, wherein the second channel 114 comprises communications between the first devices 102 and the third devices 116. In response to the activation 110, the servers 112 can establish the second channel 114. In some embodiments, the servers 112 can separately establish a first segment of the second channel 114 between the first device(s) 102 and the servers 112, and a second segment of the second channel 114 between the third device(s) 116 and the servers 112, and the servers 112 can be configured to link the first and second segments the second channel 114 in order to establish the second channel 114.

Figure 3:
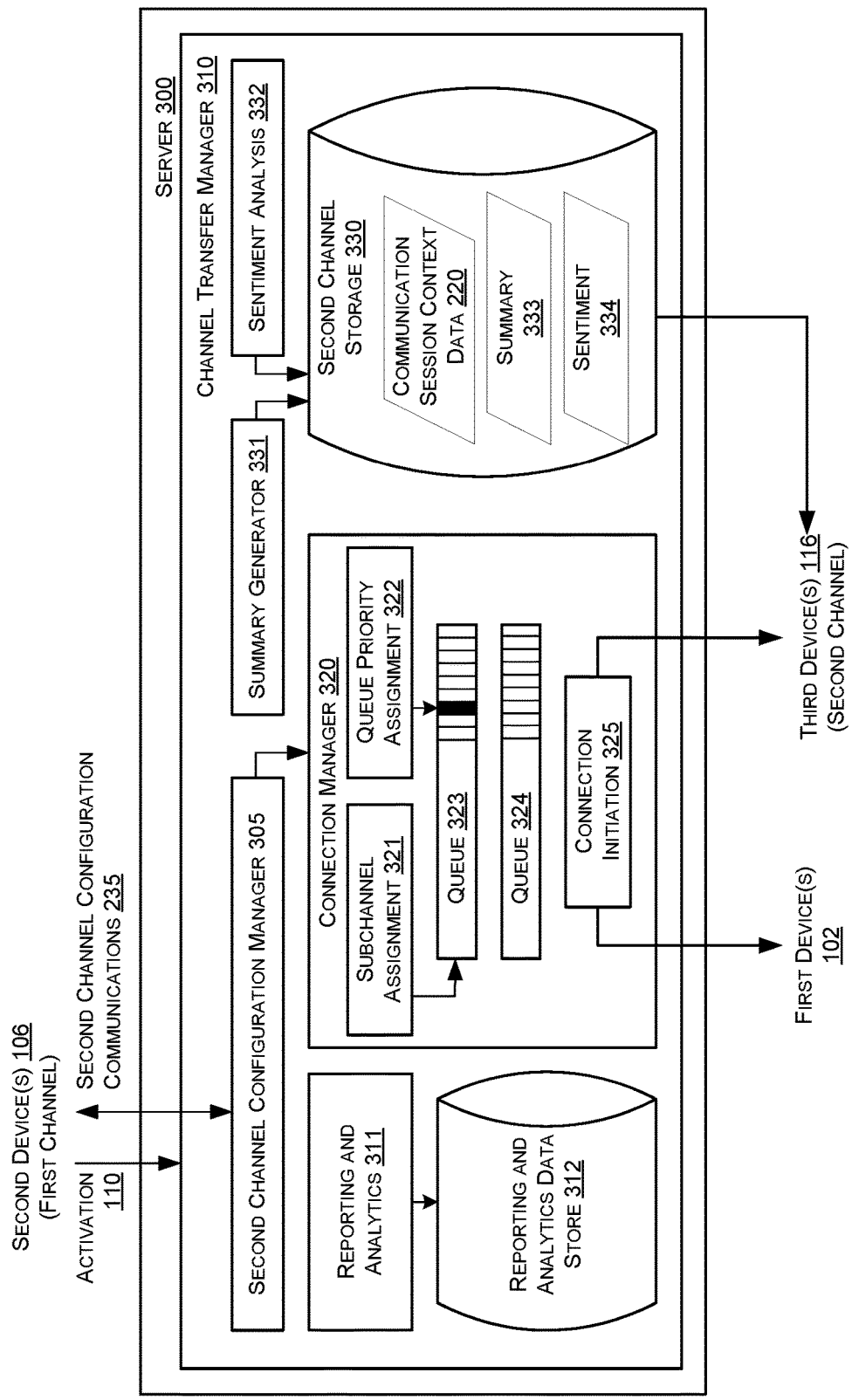
FIG. 3 illustrates an example server device that can implement the server devices introduced in FIG. 1, the example server device including a channel transfer manager and example components thereof, in accordance with one or more examples of the present disclosure.

In some example embodiments, the servers 112 can be configured with a channel transfer manager such as illustrated in FIG. 3. The channel transfer manager may also be referred to herein as an intermediary or a channel transfer bot. According to one example, the channel transfer manager can implement a chat-to-voice capability, to transfer a communication session from a first channel 108 configured as a chat channel, to a second channel 114 configured as a voice channel. The chat-to-voice capability can generally be configured to allow chat-based communication sessions to be transferred to a voice channel when deemed appropriate, and the chat-based communication sessions can be given priority routing to better serve the communication session in a quick and efficient manner.

Due to the complex nature of some issues addressed by a contact center, the customer at first devices 102 and a chat representative at the second devices 106 may spend a significant amount of time in a chat communication session that ultimately needs to be escalated to a voice channel. Handling this scenario without the benefit to this disclosure can lead to frustration for the customer, the chat representative, and the voice representative when the context information is not passed through to the voice representative and the customer has to start over with their explanation of the issue, complicating the overall experience and operational efficiency.

As described herein, when a communication session is transferred from a first channel 108 to a second channel 114, a third device 116 associated with the second channel 114 can access information, such as summary and sentiment data, pertaining to the communication session associated with the first channel 108. Accordingly, a representative that uses the third device 116 can review the provided information to determine context/historical information about the communication session. The representative that uses the third device 116 can use the context information to pick up where the communication session left off prior to the transfer, and thereby avoid confusion and/or frustration of the customer that may otherwise be involved with starting over the communication session with a new representative.

Example operations according to FIG. 1 can include a chat representative at second device(s) 106 using a second channel activation element, described in connection with FIG. 2, to transfer a communication session to an outbound voice queue implemented at servers 112. The servers 112 can be configured to automatically assign a priority routing to the communication session. The servers 112 can furthermore be configured to prompt the customer at the first device(s) 102, e.g., via the first channel 108, for desired second channel connection information, such as a callback number. Once the second channel connection information is received, the servers 112 can be configured to initiate a second channel connection request, e.g., a callback request.

To satisfy the second channel connection request, the servers 112 can be configured to first contact the first device(s) 102 to establish the first segment of the second channel 114. After the first segment is established, the servers 112 can be configured route the communication session to a selected second channel queue, to thereby establish the second segment of the second channel 114. Communication session context data including, e.g., the chat history from the first channel 108 and any automatically generated summary thereof can be provided to the third devices 116 for display to a second channel representative, e.g., in a dashboard display at the third devices 116.

Embodiments of this disclosure can reduce an overall average handle time for handling communication sessions by a contact center. Embodiments can furthermore increase customer satisfaction by reducing the need for a customer to repeat their concern or previous actions taken to address a concern. Embodiments can also collect channel transfer data and statistics, leading to better insight into contact center operations. For example, embodiments can support tracking which types of communication sessions are transferred from on channel to another. Some embodiments can associate communication sessions that are transferred from a first channel 108 to a second channel 114 with a single contact trace record, which can lead to more effective and efficient analysis of contact center operations.

Figure 2:
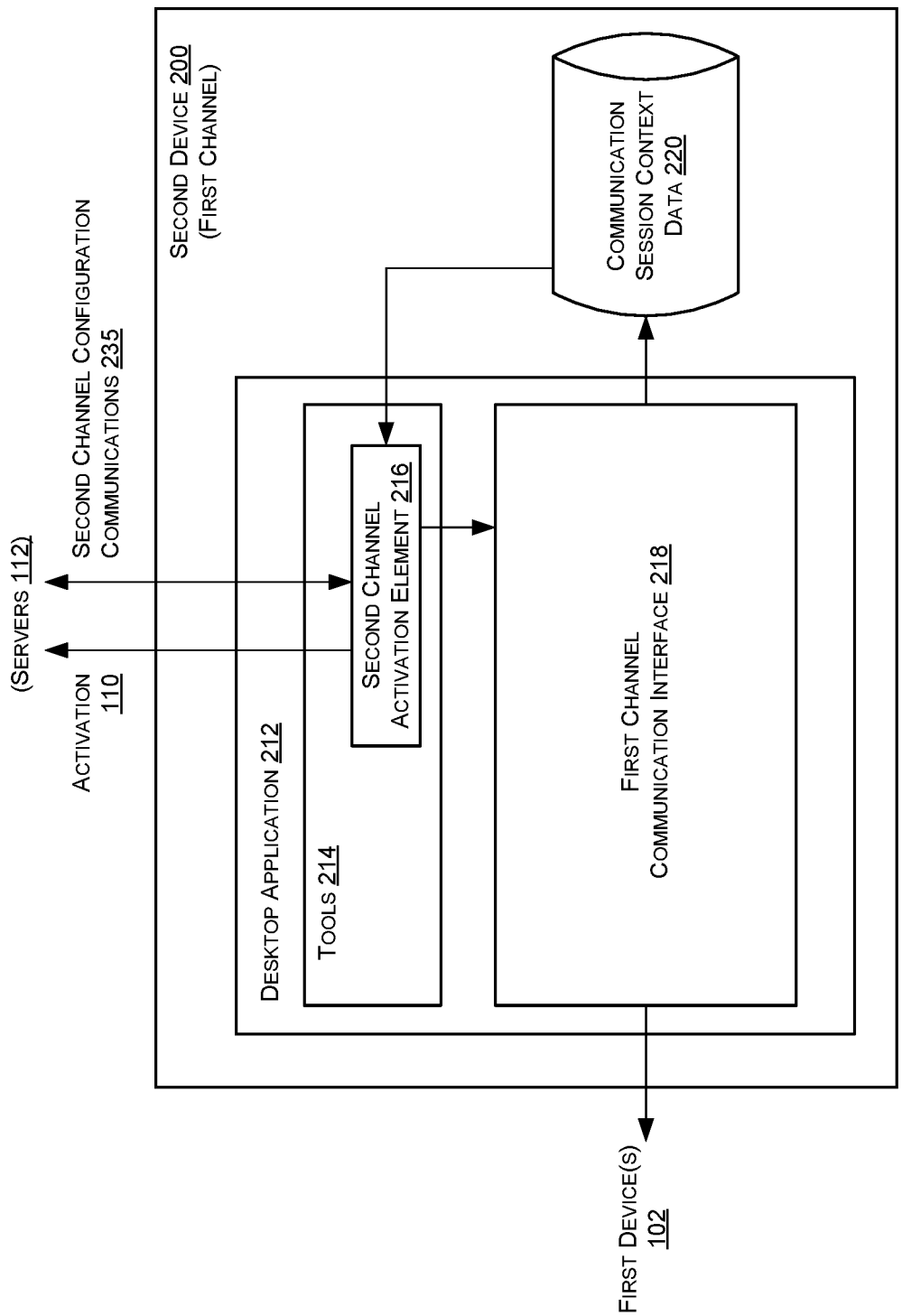
FIG. 2 illustrates an example second device that can implement the second devices introduced in FIG. 1, and example components thereof, in accordance with one or more examples of the present disclosure.

FIG. 2 illustrates an example second device 200 that can implement the second devices 106 introduced in FIG. 1, and example components thereof, in accordance with one or more examples of the present disclosure. The example second device 200 can be a device configured to communicate with first device(s) 102 in a first channel 108. The second device 200 can comprise a desktop application 212 and communication session context data 220. The desktop application 212 can include tools 214 and a first channel communication interface 218. The tools 214 can include, inter alia, a second channel activation element 216.

In an example according to FIG. 2, the first communication channel 108 can comprise, e.g., a chat-based communication channel via which a chat representative operator of the second device 200 communicates with a customer operator of a first one of the first device(s) 102. Incoming text-based chat messages from the first one of the first device(s) 102 may be displayed via the first channel communication interface 218, and the chat representative may enter and send outgoing text-based chat responses via the first channel communication interface 218. The desktop application 212 can be configured to store the incoming text-based chat messages and the outgoing text-based chat responses in the communication session context data 220.

The chat representative operator of the second device 200 can make a determination to transfer the communication session from the first channel 108 to a second channel 114. While the first channel 108 may be a text-based channel as described above, the second channel 114 can comprise, e.g., a voice-based channel. The chat representative operator of the second device 200 can select the second channel activation element 216 to initiate the transfer. In some embodiments, selection of the second channel activation element 216 can initiate several automated procedures, thereby reducing or minimizing the actions of the chat representative operator in connection with the channel transfer.

In response to selection of the second channel activation element 216, the second device 200 can be configured to initiate several automated procedures. The second device 200 can generate and send an activation 110 to the servers 112. The second device 200 can also be configured to retrieve the communication session context data 220 and send the communication session context data 220 to the servers 112. The second device 200 can also be configured to engage in second channel configuration communications 235 with the servers 112.

In an example embodiment, the second channel configuration communications 235 can include a request from the server 112 and deliverable via the second device 200 to the first device(s) 102 via the first channel communication interface 218. The request can comprise a request for second channel connection information that can be used to communicate with the first device(s) 102 via the second channel 114. The second channel connection information can comprise, e.g., an internet protocol (IP) address, a telephone number, video connection information, or any other communications information that can be used to connect with the first device(s) 102 via the second channel 114.

In some embodiments, the second device 200 can be configured to send the second channel connection information request to the first device(s) 102 via the first channel communication interface 218, receive a second channel connection information response from the first device(s) 102 via the first channel communication interface 218, and send the second channel connection information to the servers 112. The second channel connection information can be sent to servers 112 pursuant to second channel configuration communications 235 or optionally along with the activation 110 or along with the communication session context data 220.

In some embodiments, the second device 200 can be configured to send a second channel connection information request to the first device(s) 102 via the first channel communication interface 218, receive a second channel connection information response from the first device(s) 102 via the first channel communication interface 218, and store the second channel connection information in the communication session context data 220, so that the second channel connection information is provided to the servers 112, optionally along with the activation 110 and along with other data of the communication session context data 220.

In some embodiments, second channel configuration communications 235 can comprise a link to a second channel connection information user interface (UI), and the second device 200 can be configured to send to the first device(s) 102, via the first channel communication interface 218, the link to a second channel connection information UI. The second channel connection information UI can be configured to collect a second channel connection information response from the first device(s) 102 and send the received second channel connection information to the servers 112.

While the above example uses a chat-based communication channel as an example first channel 108 and a voice-based communication channel as an example second channel 114, it should be emphasized that embodiments of this disclosure are not limited to chat and voice channels. The techniques disclosed herein can be adapted for other channel types, such as video channels, social media channels, artificial intelligence (AI) based channels, and so on. Furthermore, while FIG. 2 illustrates one example second channel activation element 216, embodiments can optionally include additional second channel activation elements 216, wherein different second channel activation elements 216 initiate transfers to different channel types. In some embodiments, the second channel activation element 216 can be configured to access a directory of different second channel types, subchannels of a second channel, or representatives available via a second channel, wherein different directory elements are selectable to initiate transfers to different corresponding second channels.

The activation 110 can optionally include information about the communication session with the first device(s) 102, such as a name of a customer associated with the communication session, first channel connection information such as a device ID, IP address, telephone number, or other information used in connection with communication session, information about a customer account or other personal information associated with the customer, a name of a chat representative associated with the communication session, a communication session identifier, device information associated with the second device, a duration of the communication session via the first channel, and dates and times associated with beginning and end of communication session via the first channel. Furthermore, the activation 110 can optionally include communication session context data 220 and/or second channel connection information, as noted herein.

FIG. 3 illustrates an example server device 300 that can implement the server devices 112 introduced in FIG. 1, the example server device 300 including a channel transfer manager 310 and example components thereof, in accordance with one or more examples of the present disclosure. The channel transfer manager 310 comprises second channel configuration manager 305, reporting and analytics 311, reporting and analytics data store 312, connection manager 320, summary generator 331, sentiment analysis 332, and second channel storage 330. The connection manager 320 comprises subchannel assignment 321, queue priority assignment 322, example queues 323 and 324, and connection initiation 325. The second channel storage 330 comprises communication session context data 220, summary 333, and sentiment 334.

In an example according to FIG. 3, the channel transfer manager 310 can be configured to receive activations, such as activation 110, from second device(s) 106 such as illustrated in FIG. 1. The channel transfer manager 310 can be configured to employ the various illustrated components thereof to establish, in response to the activation 110, a second channel 114 between the first device(s) 102 and the third device(s) 116, in order to continue, via the second channel 114, a communication session that was begun in the first channel 108.

In response to receiving the activation 110, the channel transfer manager 310 can be configured to engage the second channel configuration manager 305 to retrieve second channel connection information from, e.g., the second device(s) 106. The second channel configuration manager 305 can be configured to generate a request for the second channel connection information and send the request to the second device(s) 106 as part of the second channel configuration communications 235. The second channel configuration manager 305 can be configured to subsequently receive the second channel connection information from the second device(s) 106 pursuant to second channel configuration communications 235, and the second channel configuration manager 305 can be configured to supply the second channel connection information to the connection manager 320.

The channel transfer manager 310 can be configured to store received communication session context data 220 in the second channel storage 330. The communication session context data 220 can optionally be included in the activation 110, or the communication session context data 220 can be received separately by the channel transfer manager 310. The channel transfer manager 310 can activate the summary generator 331 and/or the sentiment analysis 332, respectively, to generate the summary 333 and/or the sentiment 334, respectively, based on the communication session context data 220.

In some embodiments, the summary 333 can comprise a summary of the communication session context data 220. The summary 333 can therefore be based on the communication session context data 220. The summary 333 can furthermore optionally be based on further information, such as inferences based on a customer name, customer account type, or previous communication sessions with the customer. The sentiment 334 can comprise a customer emotional state based on emotion cues within the communication session context data 220. The emotion cues can include the presence of certain words within the communication session context data 220 or the emotion cues can be based on an issue or pattern of issues raised in the communication session context data 220, wherein the sentiment analysis 332 has learned to associate different issues or patterns of issues with different sentiments 334. In some embodiments, the sentiment 334 can be associated with a time of sentiment assessment and may remain valid for a predetermined time period, after which the sentiment 334 may expire. In some embodiments, different sentiments may be associated with different predetermined durations.

In some embodiments, the summary generator 331 and the sentiment analysis 332 can comprise machine learning components that are adapted to analyze the communication session context data 220 and generate outputs that lead to improved second channel efficiency. In embodiments that employ machine learning, the machine learning components can consume, e.g., data from communication session context data 220 as well as data from reporting and analytics data store 312. Efficiency of a machine learning generated summary 333 or sentiment 334 can be evaluated against second channel resolution efficiency information retrieved from reporting and analytics data store 312, in an efficiency enhancing feedback loop.

In some embodiments, machine learning components included in the summary generator 331 and the sentiment analysis 332 can be configured to use a library for natural language processing, e.g., spaCy or another open-source library, along with an algorithm configured to determine sentences with high recurring words used in the communication session context data 220, and determine the sentiment associated with the communication session context data 220. The machine learning components can be configured to scan, e.g., a chat transcript included in communication session context data 220, and to make a list of words that are commonly used therein. The machine learning components can be configured to generate the summary 333 or sentiment 334 based on statements including high recurring words, e.g., words occurring at a total number or rate above a predetermined number or rate threshold.

The connection manager 320 can be configured to optionally perform several operations to establish the second channel 114. The connection manager 320 can be configured to assign a communication session corresponding to the activation 110 to a selected subchannel and corresponding queue of the queues 323, 324. Furthermore, the connection manager 320 can be configured to assign a queue priority to the communication session. The connection manager 320 can also be configured to initiate a first segment of the second channel 114, the first segment comprising a link to the first device(s) 102. The connection manager 320 can also be configured to initiate a second segment of the second channel 114, the second segment comprising and to link a third device of the third device(s) 116. Finally, the connection manager 320 can be configured to provide communication session context data 220, summary 333, and/or sentiment 334 to the third device(s) 116 used in the second channel 114, by sending the data 220, 333, 324 to the third device(s) 116 or for example by sending a link or reference to an applicable location within second channel storage 330.

The subchannel assignment 321 can be adapted to assign the communication session corresponding to the activation 110 to a selected subchannel and corresponding queue of the queues 323, 324, for example by analyzing the communication session context data 220 to select a subchannel for the communication session. Words in the communication session context data 220 can be used to infer a topic or issue, and the topic or issue can be correlated to a corresponding subchannel to be selected by subchannel assignment 321. In the example illustrated in FIG. 3, the queue 323 is the selected queue, and so the communication session corresponding to activation 110 is assigned to queue 323.

The queues 323, 324 comprise priority queues that are used to determine a next communication session to connect to contact center representatives available via the second channel 114. In some embodiments, a communication session at the top of a queue, e.g., queue 323, is assigned to a next available representative with subject matter expertise in the subchannel corresponding to queue 323. The queue priority assignment 322 can determine a priority position within an assigned queue 323 for the communication session corresponding to the activation 110.

The queue priority assignment 322 can be configured to use any of several techniques disclosed herein, or combinations thereof, to assign a priority position. In some embodiments, the queue priority assignment 322 can be configured to assign a priority position based on a duration of the communication session in the first channel 108. A longer duration can result in a higher priority assignment by queue priority assignment 322. In some embodiments, queue priority assignment 322 can be configured to assign a priority position based on the communication session context data 220, the summary 333 and/or the sentiment 334. For example, different issue types may result in different priority assignment by queue priority assignment 322. In some embodiments, queue priority assignment 322 can be configured to assign a predetermined priority position to any communication session that is transferred from the first channel 108.

The connection manager 320 can also be configured to initiate a first segment of the second channel 114, the first segment comprising a link to the first device(s) 102. For example, in response to the communication session advancing to a predetermined position in the queue 323, the connection initiation 325 can be configured to use second channel connection information obtained by second channel configuration manager 305 to establish the first segment of the second channel 114, i.e., a connection to the first device(s) 102 as illustrated in FIG. 1. When the second channel 114 is a voice channel, the second channel connection information can comprise a telephone number, and the connection initiation 325 can be configured to place a telephone call to the telephone number and, e.g., play an automated message sequence to confirm identity of the telephone call recipient. In response to the first segment of the second channel 114 being successfully established, the connection initiation 325 can be configured to initiate the second segment of the second channel 114.

To initiate the second segment of the second channel 114, the connection initiation 325 be configured to select a third device of the third device(s) 116 associated with the queue 323, and to link the first segment of the second channel 114 to the selected third device. Furthermore, the connection manager 320 can provide the communication session context data 220, summary 333, and/or sentiment 334 to the selected third device. The connection manager 320 can optionally provide a link or reference to an applicable location within second channel storage 330, the link or reference being directed to the communication session context data 220, summary 333, and/or sentiment 334, so that the selected third device can automatically load the communication session context data 220, summary 333, and/or sentiment 334 in a dashboard comprising communication session information.

Reporting and analytics 311 can be configured to store data pertaining to communication sessions and channel transfers in the reporting and analytics data store 312. For example, in some embodiments, reporting and analytics 311 can be configured to store a total number of received activations, customer demographics such as age, location, and account types associated with received activations, topics or issues associated with received activations, and the like. The information in the reporting and analytics data store 312 can be retrieved by contact center devices for analysis and improvement of contact center processes.

Figure 4:
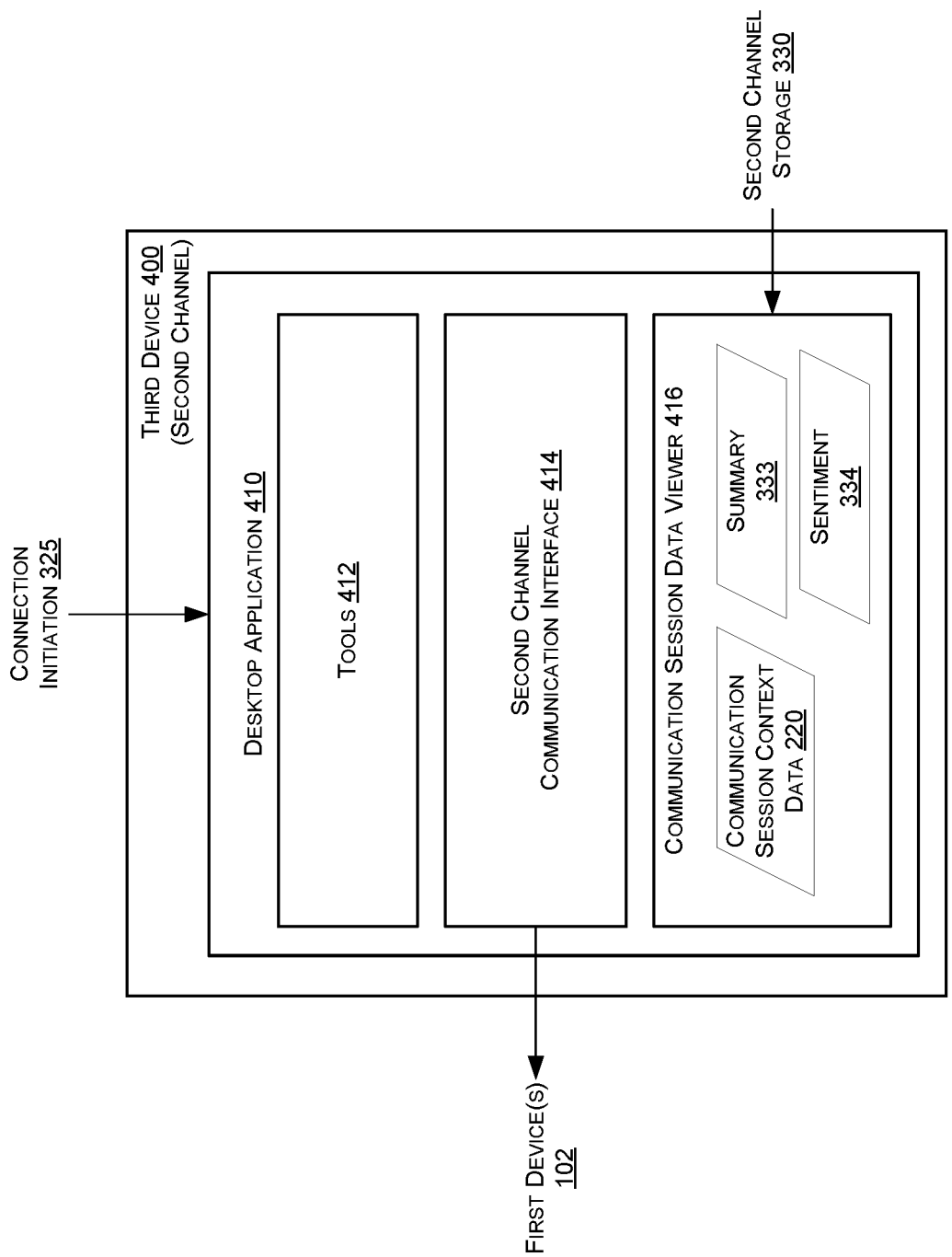
FIG. 4 illustrates an example third device that can implement the third devices introduced in FIG. 1, and example components thereof, in accordance with one or more examples of the present disclosure.

FIG. 4 illustrates an example third device 400 that can implement the third devices 116 introduced in FIG. 1, and example components thereof, in accordance with one or more examples of the present disclosure. The example third device 400 comprises a desktop application 410. The desktop application 410 comprises tools 412, second channel communication interface 414, and communication session data viewer 416. The communication session data viewer 416 can present data such as the communication session context data 220, the summary 333, and the sentiment 334, and the communication session data viewer 416 may be referred to herein as a dashboard.

In an example according to FIG. 4, the third device 400 can be selected from among the third devices 116 by the channel transfer manager 310, as described in connection with FIG. 3. For example, the third device 400 may receive a communication from connection initiation 325. The communication can comprise, e.g., a link to establish a second channel connection between the third device 400 and the first device(s) 102. In response to receiving the communication from connection initiation 325, the desktop application 410 can be configured to use the link to establish the second channel connection between the third device 400 and the first device(s) 102. The desktop application 410 can furthermore be configured to retrieve and display information associated with the communication session, namely the communication session context data 220, the summary 333, and the sentiment 334, in a dashboard interface such as the communication session data viewer 416.

The second channel communication interface 414 can optionally display current second channel data for a linked communication session, such as a live video feed, a live transcript of a voice communication, or a real-time language translation of a voice communication. In contrast, the communication session data viewer 416 can be configured to display data historical communication session data comprising information derived from first channel communications of the communication session. The tools 412 can comprise tools for managing and responding to the communication session that is active within the second channel communication interface 414, e.g., tools for flagging the communication session as resolved, transferring the communication session to a different channel according to the techniques described herein, or escalating the communication session.

Figure 5:
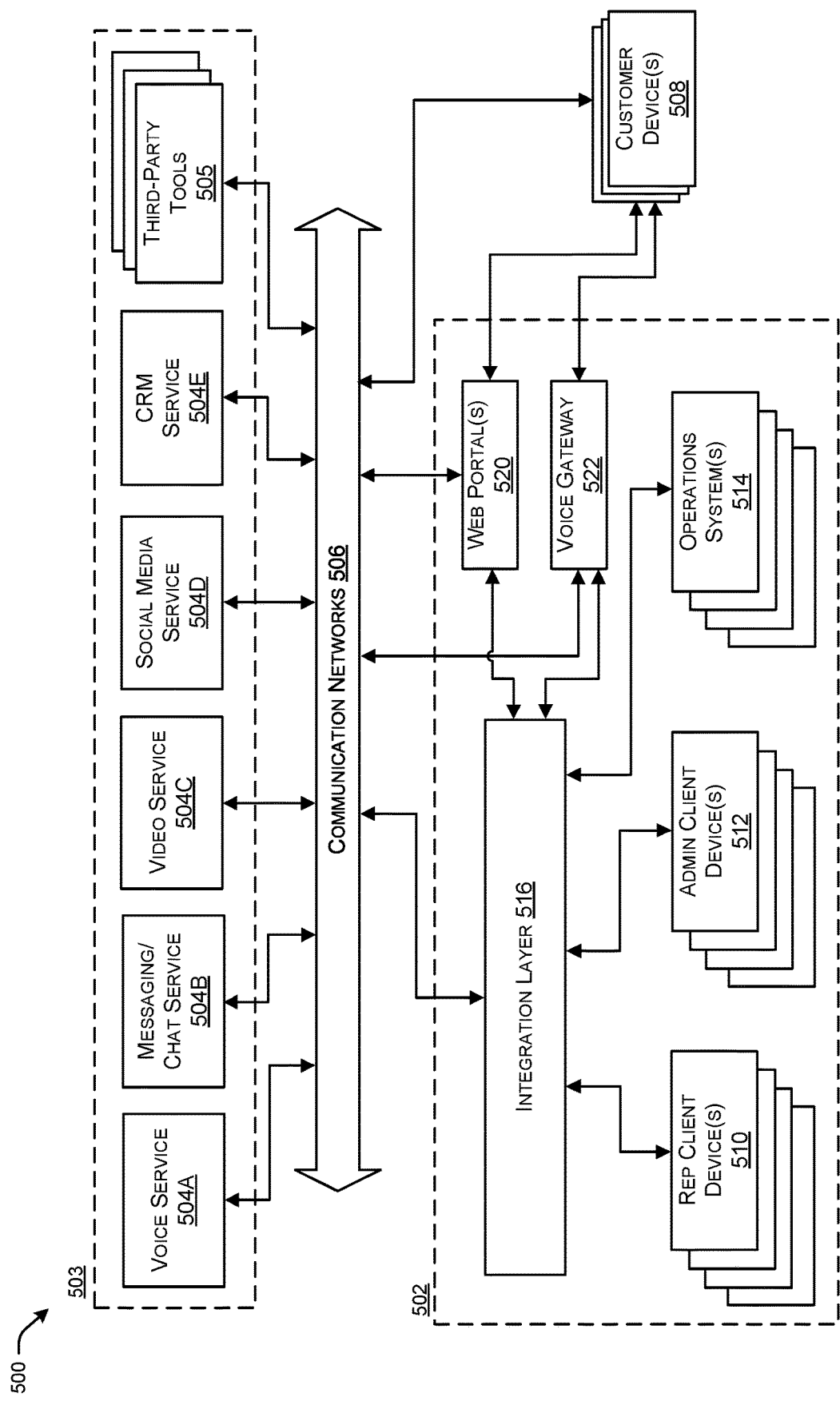
FIG. 5 illustrates a computing environment associated with an automated contact center, in accordance with one or more examples of the present disclosure.

FIG. 5 illustrates an example computing environment associated with a contact center 500, in accordance with one or more examples of the present disclosure. The contact center 500 may be or may include a server such as server 300, as detailed herein. Contact centers described herein may include fully automated and/or semi-automated contact center environments. In this example, dotted box 502 identifies the internal components of the contact center 500, and components outside the dotted box 502 represent external components associated with the contact center. As used herein, an internal component of a contact center may refer to a component (e.g., computer server or device, network component, software service, application, etc.) that is controlled by the organization operating the contact center. In contrast, an external component of the contact center may refer to a component that interacts with at least one internal component of the contact center, but which is not controlled by the organization operating the contact center. As shown in this example, the external components associated with the contact center may include a number of external communication services 504A-504E (collectively "services 504") and/or third-party tools 505 which may be provided by third-party service providers. Additional external components may include communication network(s) 506 and one or more customer devices 508 that communicate in interactive sessions with representatives (e.g., employees, contract workers, etc.) of the organization.

In some implementations, the internal components of the contact center may reside within a single server, e.g., the contact center server 300, and/or a single data center operating at one geographic location. In such cases, some or all of the internal components of the contact center 500 may communicate via a secure private network such as a private LAN or secure corporate network protected by a firewall. In other implementations, the internal components may be distributed across multiple servers and/or multiple data centers that operate at different geographic locations. Internal components that are distributed across data centers may communicate via secure private networks and/or via unsecure public networks (e.g., the Internet) and may use tunneling and encryption technologies. As illustrated, the internal and external components of the contact center may communicate via communication networks 506, including but not limited to computer networks (e.g., TCP/IP networks, etc.), wireless networks (e.g., Long-Term Evolution (LTE), 5G, a Universal Mobile Telecommunications Service (UMTS), Global System for Mobile communications (GSM) networks, etc.), satellite networks, and the like.

In operation, the contact center 500 may be implemented via the computing environment shown in FIG. 5 to provide interactive communication sessions (or interactive sessions) between customers using the customer devices 508, and representatives of the organization using representative client devices 510 ("client devices 510"). The customer device(s) 508 and/or the representative client device(s) 510 may be any personal computing devices, such as desktop or laptop computers, mobile devices (e.g., smartphones, tablet computers, etc.), wearable computing devices, or any other device capable of communicating over the communication network(s) 506. In some scenarios, a customer, client, or other individual associated with the organization may use the customer device(s) 508 to contact the organization via a point-of-contact service, such as web portal(s) 520 or a voice gateway 522. In some examples, the contact center 500 may support different services for different communication types, such as the web portal 520 that processes web chat requests received via the web site of the organization, the voice gateway 522 that processes calls received via a telephone network and/or Voice over IP (VOIP) calls. Although two customer portals/gateways into the contact center 500 are shown in this example, any number of additional customer portals/gateways may be used in other implementations, such as portals or gateway services for voice communications from the customer device(s) 508, video communications, messaging/chat communications, social-media based communications, customer relationship management (CRM) based communications, or the like.

After one of the customer device(s) 508 initiates communication with the contact center, or vice versa, the contact center components may assign the customer to a representative and initiate an interactive session between the customer device 508 and one of the representative client device(s) 510, e.g., associated with the assigned representative. Interactive sessions may include voice sessions, video sessions, messaging/web chat sessions, social media sessions, and/or CRM sessions, etc. As shown in this example, the contact center 500 may use external services 503 to implement the functionality of providing interactive sessions between customers and representatives. For instance, the contact center 500 in this example uses a voice service 504A from a first external service provider, a messaging/chat service 504B from a second external service provider, a video service 504C from a third external service provider, a social media service 504D from a fourth external service provider, and so on. In various examples, the contact center 500 may use any combination of external or internal communication services.

The external services 503 may include communication services to implement interactive sessions between a customer and a contact center representative, as well as additional services/tools to support additional features and functionalities of the contact center. For instance, one or more third-party tools 505 may be provided via external service providers and accessed by the internal systems of the contact center 500. Such third-party tools 505 may include, by way of illustration only, transcript generation and/or analysis tools, customer sentiment analysis tools, sales script tools, contact monitoring tools, data analytics tools, workforce management tools, post-interactive session survey tools, etc. As with the communication services 504A-504E, the third-party tools 505 are depicted in this example as external components of the contact center, but some or all of these tools may be implemented as internal components within the contact center.

As shown in FIG. 5, a customer may initiate communication via a web portal 520 or voice gateway 522, after which the contact center components select a communication service 504A-504E based on the communication type used by the customer, and an interactive session is initiated between the customer device 508 and representative client device 510. Although in this example the customer devices 508 are depicted as initiating communication sessions by first contacting an internal component of the contact center (e.g., web portal 520 or voice gateway 522), in other examples the customer devices 508 may initially contact an external communication service 504A-504E. For example, customer service links on the organization's web site may be hosted by and/or redirected to the external services 503. In some cases, the customer communication into the contact center may be answered first by an automated computer system (e.g., implemented within an external service or an operations system 514), which requests a series of inputs from the customer. Such automated systems may be implemented as voice response units for voice calls, conversation bots for web chat sessions, etc. The inputs requested from the customer via an automated system may include data identifying the customer (e.g., customer name, account number, ticket number, etc.), the purpose of the contact (e.g., a question type, a product model, etc.), or the language or geographic region of the customer, and the like. Based on the customer's responses, the automated system may determine where to direct the customer for an interactive session, for instance, to a particular data center, department of the organization, a particular communication channel, a representative having a particular role, criteria, or credentials, or to a particular representative that has had previous contact with the customer.

In some examples, certain internal components of the contact center may be used to select a communication service provider 504A-504E and initiate a communication session between a customer device 508 and a client device 510, after which the internal components may extricate themselves from the process and allow the selected communication service provider 504A-504E to manage the session. For example, as described below, operations systems 514 and internal computer servers and/or components within the integration layer 516 may receive and analyze data associated with incoming requests for interactive sessions from customer devices 508 and assign the interactive sessions to services 504A-504E and client devices 510 to perform the interactive session. The operations systems 514 and integration layer 516 also may receive and handle requests to transfer contacts from one representative to another, initiate multi-party interactive sessions, and initiate communication sessions between client devices 510 and administrator client devices 512 or entities within the contact center environment. The various operations systems 514 and components within the integration layer 516 also may monitor and analyze the interactive sessions to determine performance metrics for representatives and the contact center as a whole, and to implement policies and instructions based on various models (e.g., contact quality models, efficiency models, workflow projection models, etc.).

The integration layer 516 may provide a common interface between the internal systems and components of the contact center and the external services 503 used by the contact center. For example, representative client devices 510 may communicate with the external communication services 504A-504E and third-party tools 505 via the components within the integration layer 516. In some cases, the integration layer 516 provides a common framework for interfacing with the external services 503, so client applications executing on representative client devices 510 may perform similar or identical operations regardless of which external service provider is used. In such examples, the integration layer 516 may therefore provide technical advantages and improve the functioning of the contact center components by providing support for plug-and-play among the external communication services 504 and/or the third-party tools, without requiring any software change within the client applications executing on the representative client devices 510, the administrator client devices 512, and/or the customer device(s) 508.

For instance, a voice service 504A provided by a third-party vendor for a contact center 500 may be replaced by a different voice service 504A provided by a different third-party vendor, without requiring any functional change to the client applications executing within the representative client devices 510 and/or the administrator client devices 512. Similarly, the integration layer 516 may interface with multiple different external services 503 for a single communication type (e.g., multiple different voice services 504A, multiple different messaging/chat services 504B, etc.) simultaneously, so the contact center can use multiple external services 503 for a single communication type at the same time, in a manner that is transparent with respect to the external services 503, the representative client devices 510, and/or the administrator client devices 512. In such cases, an external communication service 504 may operate similarly or identically regardless of whether the contact center is using another service provider to provide an alternative communication service. The representative client devices 510 and/or the administrator client devices 512 also may operate similarly or identically regardless of which of the external services 503 (or the internal services in the dotted box 502) is providing an interactive session for the representative client device 510.

The integration layer 516 also may provide an interface between internal components of the contact center (e.g., the representative client devices 510, the administrator client devices 512, the operations systems 514) and third-party tools 505 which operate as services or applications external to the contact center 500. For instance, the internal operations systems 514 of the contact center may access third-party tools 505, such as data analytics tools, workforce management tools, etc., via the integration layer 516. The representative client devices 510 also may access the third-party tools 505 via the integration layer 516 during an interactive session between a representative and customer. The third-party tools 505 can include customer sentiment tools, post-interactive session survey tools, or the like. As noted above, the integration layer 516 may provide a uniform and common interface for accessing external third-party tools 505, so that various third-party tools 505 may be added, removed, replaced, or upgraded, without requiring any changes to the application software of the contact center internal components.

Additionally, the integration layer 516 may provide an interface between various internal components of the contact center. For example, the representative client devices 510 may communicate via the integration layer 516 with other of the representative client devices 510, with the administrator client devices 512 and/or with other internal servers/systems of the contact center 500. For instance, the integration layer 516 may perform operations associated with sending and receiving messages within the contact center 500. Moreover, the operations system(s) 514 may be implemented within internal computer servers of the contact center 500, and may provide functionalities for common queuing, monitoring, and analysis and modeling, and policy implementations across the contact center 500. As described below, client devices 510 may communicate with various operations system(s) 514 via the integration layer 516, allowing the operations system(s) 514 to receive data regarding the interactive sessions executed on the client devices 510, analyze and/or model the data, and determine operational instructions for the client devices 510 to implement operational models (e.g., rules and/or policies) across the contact center. Such models may include quality control models, workforce management models, contact center efficiency models, etc.

As illustrated by these examples and the other examples described herein, the integration layer 516 may provide additional technical advantages within contact center environments, including improving the functioning and efficiency of client devices 510 and other internal operational systems 514. For instance, the integration layer 516 may provide a common queuing framework for client devices 510, which is capable of managing the work queue(s) for the client devices 510 (e.g., live customer contact queues, deferred work item queues, etc.) received from various external and internal contact center services. As noted above, the integration layer 516 also may provide internal operational systems 514 with detailed data regarding interactive sessions from diverse client devices 510 in a consistent and uniform manner, allowing the operations systems 514 to improve the performance, contact quality, and workflow across the contact center. Operations systems 514 also may include rules engines using heuristics and/or trained machine-learned models to analyze the interactive session data received from different client devices 510 and may transmit instructions and/or policies to client devices 510 across the contact center to implement uniform and consistent models.

The integration layer 516 is depicted in FIG. 5 as a separate internal component of the contact center. In such examples, the integration layer 516 may include one or more dedicated computer servers and/or software applications or services configured to perform the functionalities of the integration layer 516 described herein. In other examples, the integration layer 516 depicted in FIG. 5 may represent a conceptual layer, in which some or all of the components and functionalities of the integration layer 516 may be implemented within other internal or external devices and systems. For instance, any or all portions of the integration layer 516 may be implemented within the external communication services 504 and/or other external services provided by third-party vendors. Additionally or alternatively, some or all of the integration layer 516 may be implemented within the client devices 510, administrator client devices 512, and/or operations systems 514 within the contact center. For example, the client devices 510 may run a desktop application and/or communication façade(s) to initiate and manage communications with external services 503 and other internal components/systems. These applications, façades, and other services or interfaces of the client devices 510 and/or other operations systems 514 of the contact center may implement various portions of the integration layer 516.

Figure 6:
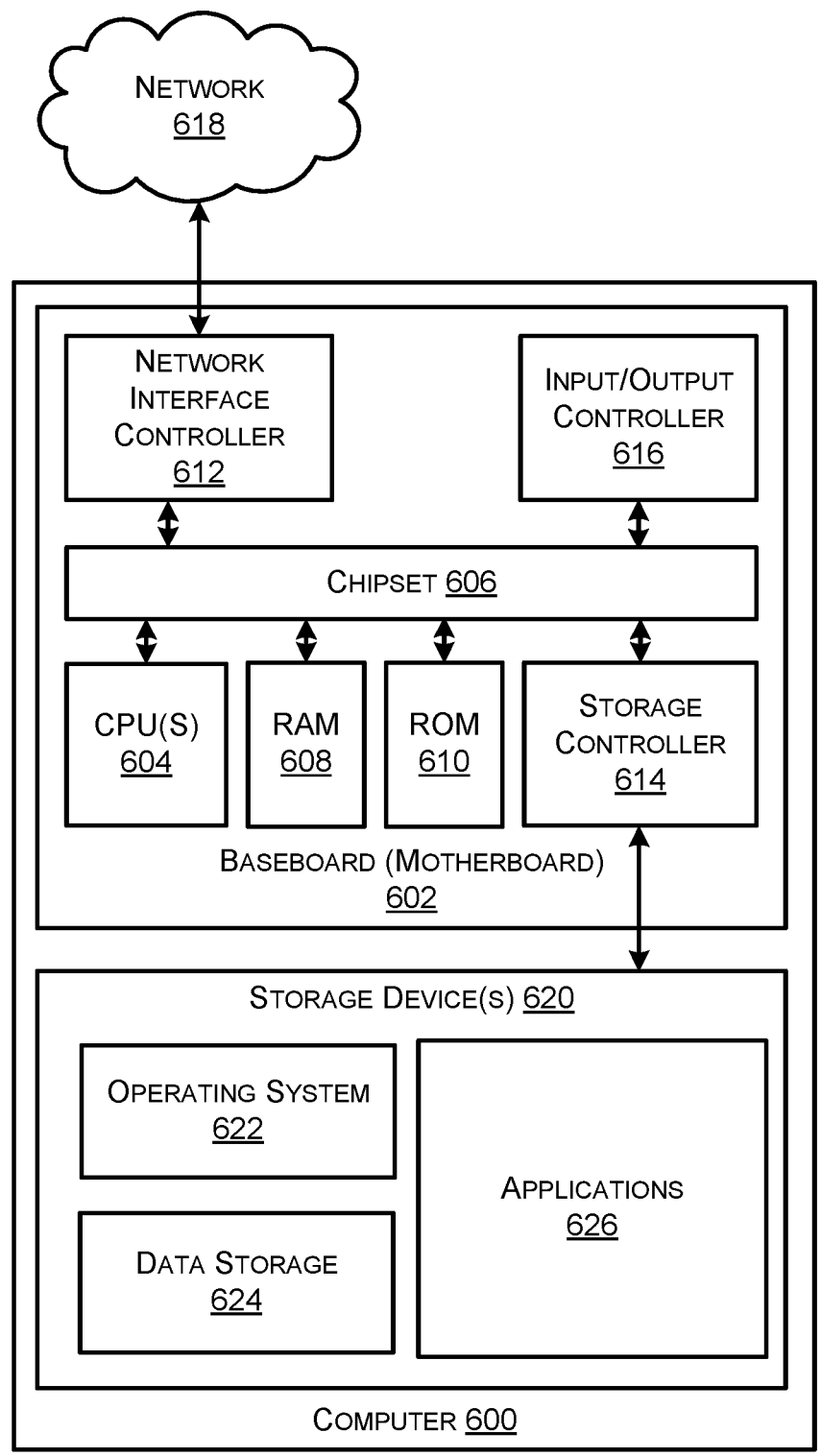
FIG. 6 shows an example computer architecture for a computer capable of executing program components for implementing the functionality described herein.

FIG. 6 shows an example computer architecture for a computer capable of executing program components for implementing the functionality described herein. The computer architecture shown in FIG. 6 may correspond to the systems and components of a server computer, workstation, desktop computer, laptop, tablet, network appliance, mobile device (e.g., tablet computer, smartphone, etc.), or other computing device, and can execute any of the software components described herein. The computer 600 may, in some examples, correspond to any of the computing systems or devices described above, such as the first device(s) 102, the second device(s) 106, the third device(s) 116, the servers 112, and/or any other computing devices described herein. It will be appreciated that in various examples described herein, a computer 600 might not include all of the components shown in FIG. 6, can include additional components that are not explicitly shown in FIG. 6, and/or may utilize a different architecture from that shown in FIG. 6.

The computer 600 includes a baseboard 602, or "motherboard," which may be a printed circuit board to which a multitude of components or devices are connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computer 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the computer 600. The chipset 606 can further provide an interface to a computer-readable storage medium such as a ROM 610 or non-volatile RAM ("NVRAM") for storing basic routines that help to startup the computer 600 and to transfer information between the various components and devices. The ROM 610 or NVRAM can also store other software components necessary for the operation of the computer 600 in accordance with the configurations described herein.

The computer 600 can operate in a networked environment using logical connections to remote computing devices and computer systems through a network, such as the network 618. The chipset 606 also may include functionality for providing network connectivity through a Network Interface Controller (NIC) 612, such as a gigabit Ethernet adapter. The NIC 612 is capable of connecting the computer 600 to other computing devices over the network 618. It should be appreciated that multiple NICs 612 can be present in the computer 600, connecting the computer to other types of networks and remote computer systems. In some instances, the NICs 612 may include at least on ingress port and/or at least one egress port.

The computer 600 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or other type of output device.

The computer 600 can include one or more storage device(s) 620, which may be connected to and/or integrated within the computer 600, that provide non-volatile storage for the computer 600. The storage device(s) 620 can store an operating system 622, data storage systems 624, and/or applications 626, such as any of the various applications and software components described herein. The storage device(s) 620 can be connected to the computer 600 through a storage controller 614 connected to the chipset 606. The storage device(s) 620 can consist of one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 600 can store data on the storage device(s) 620 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device(s) 620 are characterized as primary or secondary storage, and the like.

For example, the computer 600 can store information to the storage device(s) 620 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 600 can further read information from the storage device(s) 620 by detecting the physical states or characteristics of one or more particular locations within the physical storage units.

In addition to the storage device(s) 620 described above, the computer 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 600. In some examples, the various operations performed by a computing system (e.g., representative client devices 210, internal servers 302, etc.) may be supported by one or more devices similar to computer 600. Stated otherwise, some or all of the operations described herein may be performed by one or more computers 600 operating in a networked (e.g., client-server or cloud-based) arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device(s) 620 can store an operating system 622 utilized to control the operation of the computer 600. In some examples, the operating system 622 comprises a LINUX operating system. In other examples, the operating system 622 comprises a WIN-DOWS® SERVER operating system from MICROSOFT Corporation of Redmond, Washington. In further examples, the operating system 622 can comprise a UNIX operating system or one of its variants. It should be appreciated that other operating systems can also be utilized. The storage device(s) 620 can store other system or application programs and data utilized by the computer 600.

In various examples, the storage device(s) 620 or other computer-readable storage media is encoded with computer-executable instructions which, when loaded into the computer 600, transform the computer from a general-purpose computing system into a special-purpose computer capable of implementing various techniques described herein. These computer-executable instructions transform the computer 600 by specifying how the CPUs 604 transition between states, as described above. In some examples, the computer 600 may have access to computer-readable storage media storing computer-executable instructions which, when executed by the computer 600, perform the various techniques described herein. The computer 600 can also include computer-readable storage media having instructions stored thereupon for performing any of the other computer-implemented operations described herein.

Figure 7:
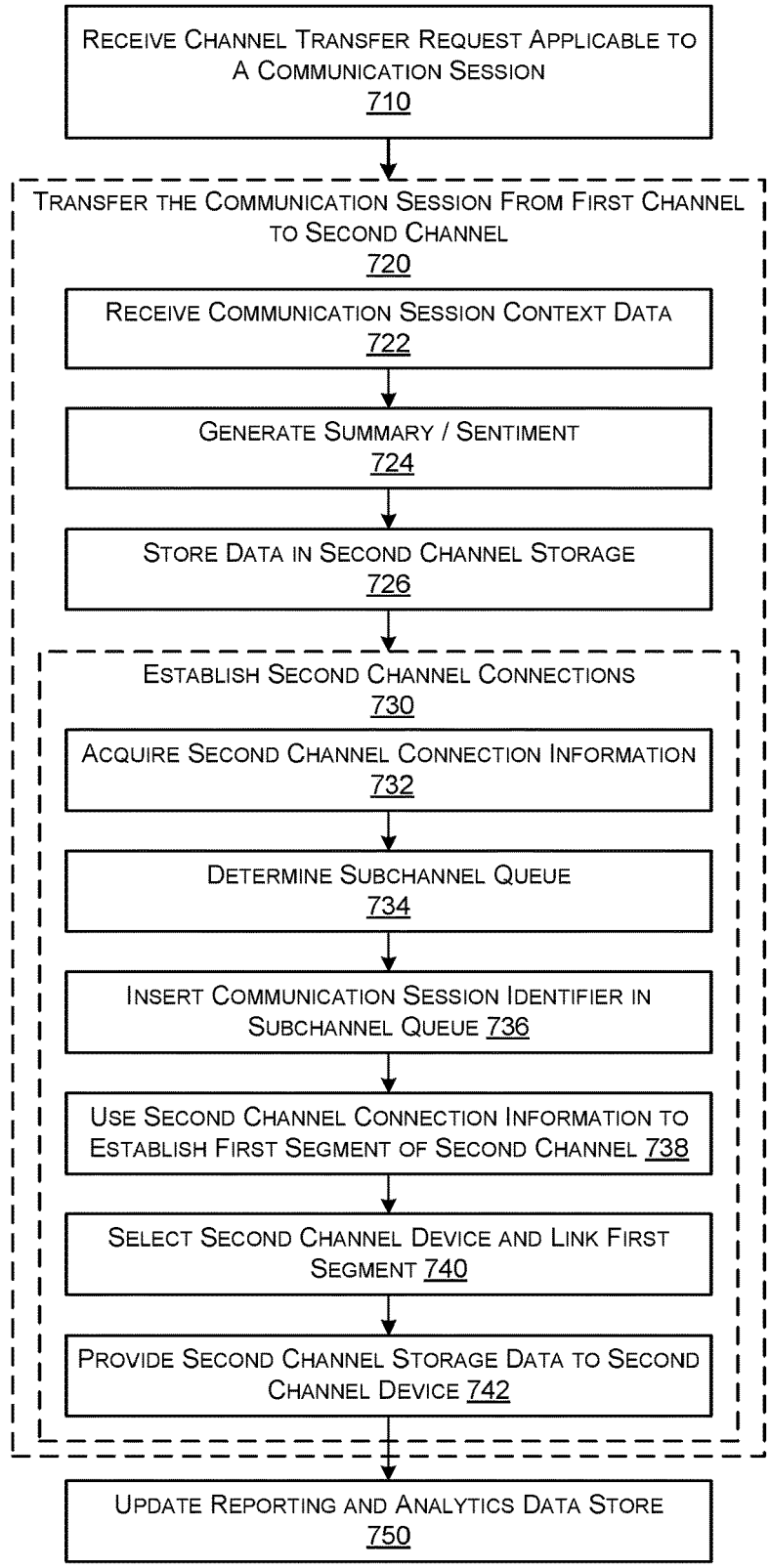
FIG. 7 is a flow diagram illustrating an example process to transfer a communication session from a first channel to a second channel, in accordance with one or more examples of the present disclosure.

FIG. 7 is a flow diagram illustrating an example process 700 to transfer a communication session from a first channel to a second channel, in accordance with one or more examples of the present disclosure. The blocks of the illustrated process 700 represent operations according to a method, components in one or more computing devices, and/or computer executable instructions in a computer readable storage medium, as can be appreciated. While the operations are illustrated in sequence, it can furthermore be appreciated that certain operations can optionally be re-ordered, combined, removed or supplemented with other operations in some embodiments.

In an embodiment, the process 700 illustrated in FIG. 7 can be performed by the servers 112 illustrated in FIG. 1. In summary, the process 700 includes receiving a channel transfer request at operation 710, performing the requested channel transfer at operations 720, and updating reporting and analytics data at operation 750. Performing the requested channel transfer at operations 720 can include operations 722, 724, and 726 which generate and store data in second channel storage, and operations 730 to establish the second channel connections, e.g., between the first device(s) 102 and the third device(s) 116 illustrated in FIG. 1.

At operation 710, the servers 112 can receive a channel transfer request applicable to a communication session. For example, the servers 112 can receive the activation 110, wherein the activation 110 comprises a request to transfer a communication session from a first channel 108 to a second channel 114. The first channel 108 can comprise, connect, or otherwise be associated with one or more first devices 102 and one or more second devices 106, and the second channel 114 can comprise, connect, or otherwise be associated with the one or more first devices 102 and one or more third devices 116. In some embodiments, the first channel 108 can comprise a first communication mode such as a text-based communication mode, and the second channel 114 can comprise a second communication mode such as a voice-based communication mode. The received request, e.g., the activation 110, can be from an electronic device of the one or more second devices 106, the electronic device comprising an activation tool such as the second channel activation element 216 illustrated in FIG. 2, wherein the activation tool 216 is configured to generate the request/activation 110 during the first channel 108 communication session with the first device(s) 102.

At operation 720, in response to the request received at operation 710, the servers 112 can transfer the communication session from first channel 108 to second channel 114. Transferring the communication session from the first channel 108 to second channel 114 can comprise operations 722, 724, and 726 as well as operations 730.

At operation 722, the servers 112 can receive communication session context data 220 from the one or more second devices 106 of the first channel 108. At operation 724, the servers 112 can generate a communication session summary 333 and/or a sentiment 334. In some embodiments, the communication session summary 333 can be based at least in part on recurring data included in the communication session context data 220. For example, the recurring data can comprise recurring words included in the communication session context data 220 and generating the communication session summary 333 can comprise applying a machine learning component to generate the communication session summary 333 based on the recurring words. In contrast, the sentiment 334 can be based on occurrence of one or more predetermined emotion identifier terms within the communication session context data 220. At operation 726, the servers 112 can store the communication session context data 220, the communication session summary 333 and/or the sentiment 334 in a second channel storage location 330 that is accessible by the one or more third devices 116 of the second channel 114.

At operation 730, the servers 112 can establish, based on the request received at operation 710, a connection between the one or more first devices 102 and the one or more third devices 116 of the second channel 114. Establishing the connection between the one or more first devices 102 and the one or more third devices 116 of the second channel 114 can comprise, e.g., operations 732-742.

At operation 732, the servers 112 can acquire second channel connection information from the one or more first devices 102. For example, the second channel configuration manager 305 illustrated in FIG. 3 can use second channel configuration communications 235 to acquire the second channel connection information.

At operation 734, the servers 112 can optionally determine a subchannel queue. For example, when the second channel 114 comprises multiple subchannels, the servers 112 can apply subchannel assignment 321 to determine, based the communication session context data 220, a subchannel of the multiple subchannels for the communication session, and a corresponding queue 323. Transferring the communication session to the second communication channel 114 can include assigning, by subchannel assignment 321, the communication session to the subchannel.

At operation 736, the servers 112 can insert a communication session identifier associated with the communication session in a second channel queue, e.g., in the queue 323. The insertion can be made for example by queue priority assignment 322. In some embodiments, inserting the communication session identifier in the second channel queue 323 can comprise inserting the communication session identifier at a position within the second channel queue 323 having a first priority level, the first priority level being higher than a second priority level of another communication session identifier within the second channel queue 323. Queue priority assignment 322 can be configured to determine the position based on, e.g., a duration of the communication session in the first channel 108 or based at least in part on the communication session context data 220, e.g., based on customer account information and/or an issue or topic identified in the communication session context data 220.

In response to expiration of a period of time according to the second channel queue 323, e.g., after the communication session identifier reaches a predetermined position in the second channel queue 323, at operation 738 the servers 112 can use the acquired second channel connection information, acquired at operation 732, to establish the first segment of the second channel 114. The first segment can include a connection between the servers 112 and the first device(s) 102, as illustrated in FIG. 1.

At operation 740, in response to success in establishing the first segment at operation 738, the servers 112 can select a third device from among the one or more third devices 116. The selected third device can be associated with a subchannel determined at operation 734. If a pool of third devices is available, the servers 112 can select for example a first available third device from the pool, or else, e.g., a third device that is a shortest network distance from the first device(s) 102.

At operation 742, the servers 112 can provide the communication session context data 220, the communication session summary 333 and/or the sentiment 334 from second channel storage location 330 to the selected third device. In some embodiments, the servers 112 can load the communication session context data 220, summary 333 and/or sentiment 334 at a location accessible by at least one third device of the one or more third devices 116. For example, the servers 112 can load the data in an active cache for ease of access by the one or more third devices 116. Upon completion of operation 742, the second channel connection is established and the servers 112 can end the second channel establishment task.

At operation 750, the servers 112 can update a data store such as reporting and analytics data store 312 with request information associated with the request received at operation 710. The request information can comprise, e.g., an identification of the first channel 108, an identification of the second channel 114, identifications of the first device(s) 102, second device(s) 106, and/or third device(s) 116, date and time of channel transfer, duration of the communication session in the first and/or second channels, a topic identified based on the communication session context data 220, a sentiment 334, a summary 333, a customer and/or customer account type information, and/or any other information from communication session context data 220. In some embodiments the reporting and analytics data store 312 can comprise, inter alia, a total number of channel transfer requests to transfer communication sessions from the first channel 108 to the second channel 114. In some embodiments the reporting and analytics data store 312 can comprise statistics related to numbers of channel transfer requests generated by different second devices of the second device(s) 106 and/or corresponding representatives.

Variations of FIG. 7 can be understood with the benefit of this disclosure. For example, in on example variation, at operation 710 a channel transfer request can be received to transfer a communication session from a first channel 108 to a second channel 114, wherein the first channel 108 comprises one or more first devices 102 and one or more second devices 106, and wherein the second channel 114 includes the one or more first devices 102 and one or more third devices 116.

At 722, communication session context data 220 can be received, wherein the communication session context data 222 is acquired via the first channel 108. At 724, a machine learning component can be used to generate a summary 333 based on the communication session context data 220.

At 730, a second channel connection can be established between the one or more third devices 116 and the one or more first devices 102 in order to fulfill the channel transfer request received at 710. Establishing the second channel connection can comprise operations 732-742, e.g., acquiring at 732 and via the first channel 108, second channel connection information from the one or more first devices 102; inserting at 736 an identifier associated with the communication session in a second channel queue 323; using at 738 using the second channel connection information to establish a first connection to the one or more first devices 102 in accordance with a position of the identifier in the second channel queue 323; providing at 742 the communication session context data 220 to a selected device of the one or more third devices 116; and linking at 740 the first connection to the selected device of the one or more third devices 116.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

As used herein, the term "based on" can be used synonymously with "based, at least in part, on" and "based at least partly on."

As used herein, the terms "comprises/comprising/comprised" and "includes/including/included," and their equivalents, can be used interchangeably. An apparatus, system, or method that "comprises A, B, and C" includes A, B, and C, but also can include other components (e.g., D) as well. That is, the apparatus, system, or method is not limited to components A, B, and C.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method, comprising:
   receiving, by a system comprising one or more processors during a communication session between a first device and a second device, an indication of an input to an activation element of a user interface displayed via the first device, wherein the activation element is associated with a second channel, and wherein the input comprises a request to transfer the communication session from a first channel to the second channel, wherein:
      the first channel connects the first device and the second device, and
      the second channel connects the second device and one or more third devices; and
   in response to the request to transfer the communication session, transferring, by the system, the communication session from the first channel to the second channel, wherein transferring the communication session from the first channel to the second channel comprises:
      sending, by the system and to the first device, a request for second-channel connection information for communicating with the second device via the second channel, wherein the first device is configured to provide the request for the second-channel connection information to the second device via a first-channel communication interface;
      receiving, by the system and from the first device, the second-channel connection information, wherein the second-channel connection information is obtained by the first device from the second device via the first-channel communication interface;
      receiving, by the system and from the first device, communication session context data acquired via the first channel;
      generating, by the system, a communication session summary based at least in part on recurring data included in the communication session context data;
      storing, by the system, the communication session context data and the communication session summary in a second channel storage location that is accessible by the one or more third devices; and
      establishing, by the system and based on the request to transfer the communication session, a connection between the second device and the one or more third devices via the second channel.

2. The method of claim 1, wherein establishing, by the system, the connection between the second device and the one or more third devices via the second channel comprises:
   inserting, by the system, a communication session identifier associated with the communication session in a second channel queue; and
   after expiration of a period of time according to the second channel queue, using, by the system, the second-channel connection information to establish the connection between the second device and the one or more third devices.

3. The method of claim 2, wherein establishing, by the system, the connection between the second device and the one or more third devices via the second channel further comprises:
   selecting, by the system, a third device from among the one or more third devices; and
   providing, by the system, the communication session context data and the communication session summary from the second channel storage location to the third device.

4. The method of claim 2, wherein inserting, by the system, the communication session identifier in the second channel queue comprises inserting the communication session identifier at a position within the second channel queue having a first priority level, the first priority level being higher than a second priority level of another communication session identifier within the second channel queue.

5. The method of claim 4, wherein inserting the communication session identifier at the position within the second channel queue comprises determining the position based on a duration of the communication session in the first channel.

6. The method of claim 1, wherein the first channel is a text-based interaction channel and wherein the second channel is a voice-based channel.

7. The method of claim 1, wherein the second channel comprises multiple subchannels, the method further comprising:
   determining, by the system and based on the communication session context data, a subchannel of the multiple subchannels for the communication session, wherein transferring the communication session to the second channel includes assigning, by the system, the communication session to the subchannel.

8. The method of claim 1, wherein the recurring data comprises recurring words included in the communication session context data.

9. The method of claim 1, further comprising updating, by the system, a data store with request information associated with the request to transfer the communication session, wherein the request information comprises a topic identified based on the communication session context data.

10. The method of claim 1, wherein the request to transfer the communication session from the first channel to the second channel comprises an activation message.

11. The method of claim 1, wherein the connection between the second device and the one or more third devices includes a web portal or voice gateway.

12. The method of claim 1, wherein the second-channel connection information and the communication session context data are received in a same communication.

13. A system, comprising:
one or more processors; and
one or more non-transitory computer-readable media storing computer-executable instructions that, when executed by the one or more processors, cause the one or more processors to perform operations comprising:
receiving, during a communication session between a first device and a second device, an indication of an input to an activation element of a user interface displayed via the first device, wherein the activation element is associated with a second channel, wherein the input comprises a request to transfer the communication session from a first channel to the second channel, wherein the first channel connects the first device and the second device, and wherein the second channel connects the second device and one or more third devices;
sending, by the system and to the first device, a request for second-channel connection information for communicating with the second device via the second channel, wherein the first device is configured to provide the request for the second-channel connection information to the second device via a first-channel communication interface;
receiving, by the system and from the first device, the second-channel connection information, wherein the second-channel connection information is obtained by the first device from the second device via the first-channel communication interface;
receiving, from the first device, communication session context data acquired via the first channel;
generating a communication session summary based at least in part on recurring data included in the communication session context data;
establishing a connection between the second device and the one or more third devices via the second channel in order to fulfill the request to transfer the communication session from the first channel to the second channel; and
loading the communication session context data and the communication session summary at a location accessible by at least one third device of the one or more third devices.

14. The system of claim 13, wherein the recurring data comprises recurring words included in the communication session context data, and wherein generating the communication session summary comprises applying a machine learning component to generate the communication session summary based on the recurring words.

15. The system of claim 13, wherein establishing the connection between the second device and the one or more third devices via the second channel comprises inserting an identifier associated with the communication session in a second channel queue at a higher priority position within the second channel queue, the higher priority position having a higher priority than at least one lower priority position, wherein inserting the identifier at the higher priority position comprises determining the higher priority position based at least in part on the communication session context data.

16. The system of claim 15, wherein inserting the identifier at the higher priority position comprises determining the higher priority position based on a duration of the communication session in the first channel.

17. The system of claim 13, wherein the first channel is a text-based channel and wherein the second channel is a voice-based channel.

18. One or more non-transitory computer-readable media storing instructions executable by a processor, wherein the instructions, when executed by the processor, cause the processor to perform operations comprising:
receiving, during a communication session between a first device and a second device, an indication of input to an activation element of a user interface displayed via the first device, wherein the activation element is associated with a second channel, wherein the input comprises a channel transfer request to transfer the communication session from a first channel to the second channel, wherein the first channel connects the first device and the second device, and wherein the second channel connects the second device and one or more third devices;
sending, to the first device, a request for second-channel connection information for communicating with the second device via the second channel, wherein the first device is configured to provide the request to the second device via a first-channel communication interface;
receiving, from the first device, the second-channel connection information, wherein the second-channel connection information is obtained by the first device from the second device via the first-channel communication interface;
receiving, from the first device, communication session context data acquired via the first channel; and
establishing a second channel connection between the one or more third devices and the second device in order to fulfill the channel transfer request, wherein establishing the second channel connection comprises:
inserting an identifier associated with the communication session in a second channel queue;
using the second-channel connection information to establish a first connection to the second device in accordance with a position of the identifier in the second channel queue;
providing the communication session context data to a selected device of the one or more third devices; and
linking the first connection to the selected device.

19. The one or more non-transitory computer-readable media of claim 18, wherein the operations further comprise using a machine learning component to generate a summary based on the communication session context data.

20. The one or more non-transitory computer-readable media of claim 18, wherein the operations further comprise updating a data store with channel transfer request information associated with the channel transfer request, wherein the data store comprises a total number of channel transfer requests to transfer communication sessions from the first channel to the second channel.

* * * * *